United States Patent
Wolf

(10) Patent No.: US 7,648,304 B2
(45) Date of Patent: Jan. 19, 2010

(54) SHIELD FOR A VEHICLE SUSPENSION BALL JOINT

(75) Inventor: David Wolf, Marysville, OH (US)

(73) Assignee: Honda Motor Co., Ltd, Tokyo (JP)

( * ) Notice: Subject to any disclaimer, the term of this patent is extended or adjusted under 35 U.S.C. 154(b) by 81 days.

(21) Appl. No.: 11/271,055

(22) Filed: Nov. 11, 2005

(65) Prior Publication Data
US 2006/0110213 A1    May 25, 2006

Related U.S. Application Data

(60) Provisional application No. 60/627,051, filed on Nov. 12, 2004.

(51) Int. Cl.
*F16C 11/06* (2006.01)
*B60G 25/00* (2006.01)

(52) U.S. Cl. ............... 403/134; 403/29; 280/93.512

(58) Field of Classification Search .......... 403/50, 403/51, 134, 24, 56, 76, 90; 277/635; 464/171, 464/175; 280/93.512
See application file for complete search history.

(56) References Cited

U.S. PATENT DOCUMENTS

| | | | | |
|---|---|---|---|---|
| 2,126,389 | A | * | 8/1938 | Hufferd ................... 403/51 |
| 2,686,070 | A | * | 8/1954 | Booth ...................... 403/117 |
| 2,878,047 | A | * | 3/1959 | Booth ...................... 403/130 |
| 2,885,236 | A | * | 5/1959 | Carlson ..................... 403/75 |
| 3,021,157 | A | * | 2/1962 | Moskovitz ................ 403/134 |
| 3,075,370 | A | * | 1/1963 | Kings ...................... 464/171 |
| 3,208,134 | A | * | 9/1965 | Krewson, Jr. |
| 3,240,509 | A | * | 3/1966 | Pierce ..................... 403/134 |
| 3,357,728 | A | * | 12/1967 | Melton et al. ............ 403/134 |
| 3,842,621 | A | * | 10/1974 | Mazziotti ................. 464/175 |
| 3,901,518 | A | | 8/1975 | Uchida |
| 4,241,928 | A | | 12/1980 | Nemoto et al. |
| 4,304,416 | A | * | 12/1981 | Oshima ..................... 277/561 |
| 4,650,362 | A | * | 3/1987 | Kubo ........................ 403/134 |
| 4,848,950 | A | | 7/1989 | Haberstroh |
| 4,856,795 | A | | 8/1989 | DeLano et al. |
| 4,869,482 | A | * | 9/1989 | Beccaceci |
| 5,100,254 | A | | 3/1992 | Wasada |
| 5,413,431 | A | | 5/1995 | Fellows |
| 5,484,218 | A | | 1/1996 | Fellows |
| 5,498,092 | A | | 3/1996 | Fellows |
| 5,531,534 | A | | 7/1996 | Urbach |
| 5,538,275 | A | | 7/1996 | Lomnick |
| 6,095,712 | A | | 8/2000 | Ridley et al. |
| 6,102,604 | A | | 8/2000 | Maughan |

(Continued)

FOREIGN PATENT DOCUMENTS

DE        690752    *   4/1940

(Continued)

*Primary Examiner*—Daniel P Stodola
*Assistant Examiner*—Ernesto Garcia
(74) *Attorney, Agent, or Firm*—Mark Duell; Michael A. Forhan; Eley Law Firm Co.

(57) ABSTRACT

A shield for a vehicle suspension ball joint having a receptacle configured to receive a flexible dust cover. The shield comprises a rigid shroud connected to the receptacle. The shroud generally surrounds the dust cover and is positioned proximate an arm of the vehicle suspension. The shield protects the dust cover from road-borne materials.

1 Claim, 5 Drawing Sheets

U.S. PATENT DOCUMENTS

| | | |
|---|---|---|
| 6,357,956 B1 * | 3/2002 | Zebolsky et al. ............ 403/134 |
| 6,530,711 B2 | 3/2003 | Menotti |
| 6,644,883 B2 | 11/2003 | Davis |
| 6,857,811 B2 | 2/2005 | Abels |
| 2005/0002727 A1 | 1/2005 | Nienaber et al. |
| 2005/0042022 A1 | 2/2005 | Abels et al. |

FOREIGN PATENT DOCUMENTS

| | | | |
|---|---|---|---|
| DE | 6601766 | * | 3/1969 |
| DE | 1525083 A | * | 7/1970 |
| EP | 570736 A1 | * | 11/1993 |
| FR | 765514 | * | 6/1934 |
| GB | 892025 | * | 3/1962 |
| JP | 62200010 A | * | 9/1987 |

* cited by examiner

US 7,648,304 B2

SHIELD FOR A VEHICLE SUSPENSION BALL JOINT

This application claims priority to U.S. provisional application 60/627,051, filed Nov. 12, 2004, the contents of which are hereby incorporated by reference.

FIELD

The present invention relates generally to vehicle suspensions and, more particularly, to a shield configured to resist build-up of snow and ice around a dust cover for a ball joint of a vehicle suspension.

BACKGROUND

Suspension systems function to isolate occupants of a moving vehicle from the discomfort of rough or uneven terrain. Suspension systems also provide a vehicle with resistance to lateral roll of the vehicle's body during turns. As is well-known in the art, the steering mechanism for the front wheels of automobiles is typically provided with suspension ball joints between suspension arms and a steering knuckle. Various types of suspension ball joint mechanisms, such as wishbone type, MacPherson type, as well as other types, have been developed, improved and adapted for use with vehicles. The ball joints typically include flexible dust covers to resist the ingress of contaminants such as dust, dirt and debris from entering the joints. Such contaminants, if allowed to enter a ball joint, tend to act as abrasives, reducing the service life of the ball joint.

A shortcoming of current vehicle suspension designs is that they permit road-borne materials such as snow, ice and debris to accumulate proximate the dust covers. The flexible dust covers are subject to deformation due to pressure exerted by the accumulated materials, forcing the dust covers to come into contact with other nearby suspension components. Normal movement of the suspension during operation of the vehicle can subsequently cause the dust cover to be pinched by nearby suspension components, causing the dust cover to be pierced, torn or similarly damaged. This in turn allows migration of lubricants contained by the dust cover in the ball joint.

Others have attempted to provide protection for suspension ball joints. For example, U.S. Pat. No. 6,095,712 to Ridley et al., discloses a metal protective spring clip for a vehicle steering linkage joint. The protective clip includes a heat shield to protect a rubber gaiter from heat generated by a nearby disc brake assembly. However, the heat shield does not substantially surround the ball joint, the shield being intended to protect only the areas of the ball joint proximate the disc brake assembly. Consequently, the protective clip is not effective to protect the ball joint from damage by road-borne material, such as ice, snow and debris.

U.S. Pat. No. 5,100,254, issued to Wasada, discloses a shield for a ball joint. The shield is intended to protect the ball joint from flying stones and includes a body having a cup shape formed by a curved flange portion. The body is elastic to resist deformation from flying stones. However, the elastic nature of the body renders it ineffective for breaking up rigid accumulated materials such as ice or forcing the materials away from the ball joint.

A further disadvantage of current ball joint shields is that they are made as separate components and thus must be fabricated and assembled to the ball joint in some manner. This requires time and labor, adding to the cost of the vehicle. There is a need for an economical and durable way to resist the build-up of snow and ice materials proximate the dust cover of a front suspension ball joint, and to break up and disperse accumulated material.

SUMMARY

A suspension knuckle having a shield for a vehicle suspension ball joint is disclosed according to an embodiment to the present invention. A receptacle of the suspension knuckle is adapted to receive a dust cover. The receptacle includes a generally parabolic shield having a shroud portion that surrounds at least a portion of the dust cover. The shield is effective to resist build-up of at materials such as ice, snow and debris on the dust cover that could deform or reposition the dust cover, making it susceptible to damage by movement of nearby suspension components during operation of the vehicle.

An aspect of the present invention is a shield for a vehicle suspension ball joint having a receptacle configured to receive a flexible dust cover in which the shield comprises a rigid shroud connected to the receptacle. The shroud generally surrounds the dust cover and is positioned proximate an arm of the vehicle suspension. The shield protects the dust cover from road-borne materials.

Another aspect of the present invention is a shield for a vehicle suspension ball joint having a receptacle configured to receive a flexible dust cover in which the shield comprises a generally parabolic, rigid shroud connected to the receptacle, the shroud generally surrounding the dust cover and being positioned proximate an arm of the vehicle suspension. At least one tang is connected to at least one of the shroud and the receptacle. The shield cooperates with the arm of the vehicle suspension to break up accumulated road-borne materials. In addition, the tang is effective to deflect or wipe accumulated road-borne material away from the dust cover.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
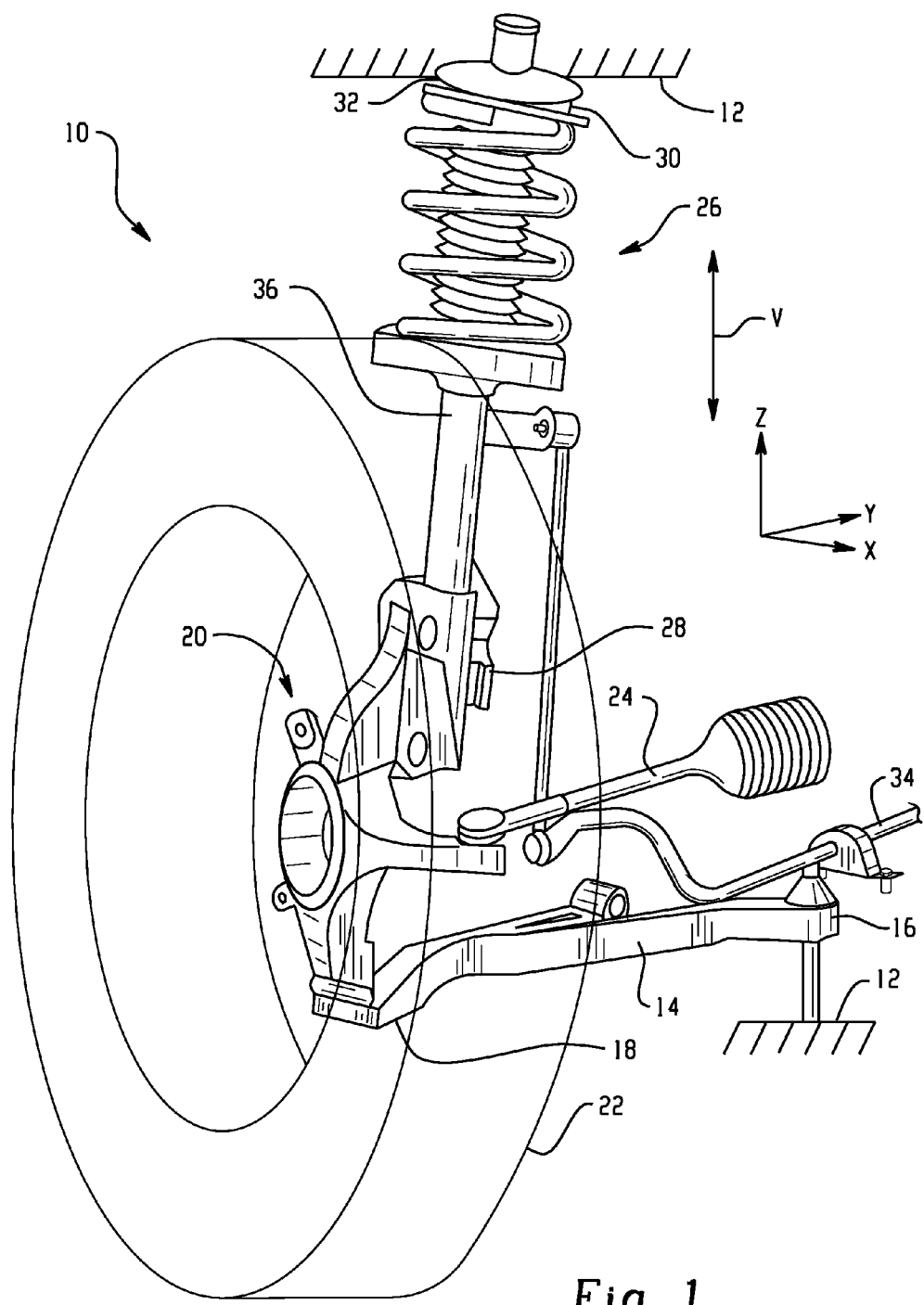
FIG. 1 is a perspective view of the general arrangement of a vehicle suspension system according to an embodiment of the present invention.

The general arrangement of relevant portions of a suspension assembly 10 are shown in FIG. 1. Suspension assembly 10 includes a frame 12 (depicted in schematic form), which may incorporate multiple frame portions secured to one another. A lower control arm 14 includes first and second opposing portions 16 and 18. The first portion 16 of the lower control arm 14 is pivotally connected to the frame 12, and the second portion 18 supports a knuckle 20 having a wheel 22 supported thereon. An end of a tie rod 24 is pivotally coupled to knuckle 20.

A strut 26 is connected intermediate knuckle 20 and frame 12 for providing damping in response to vertical movement V of wheel 22 from the vehicle rolling condition and other inputs from the roadway. Strut 26 includes a lower end 28 secured to knuckle 20 and an upper end 30 connected to frame 12 at an upper connection 32. A stabilizer bar 34 is coupled to a damper 36 of strut 26.

Figure 2:
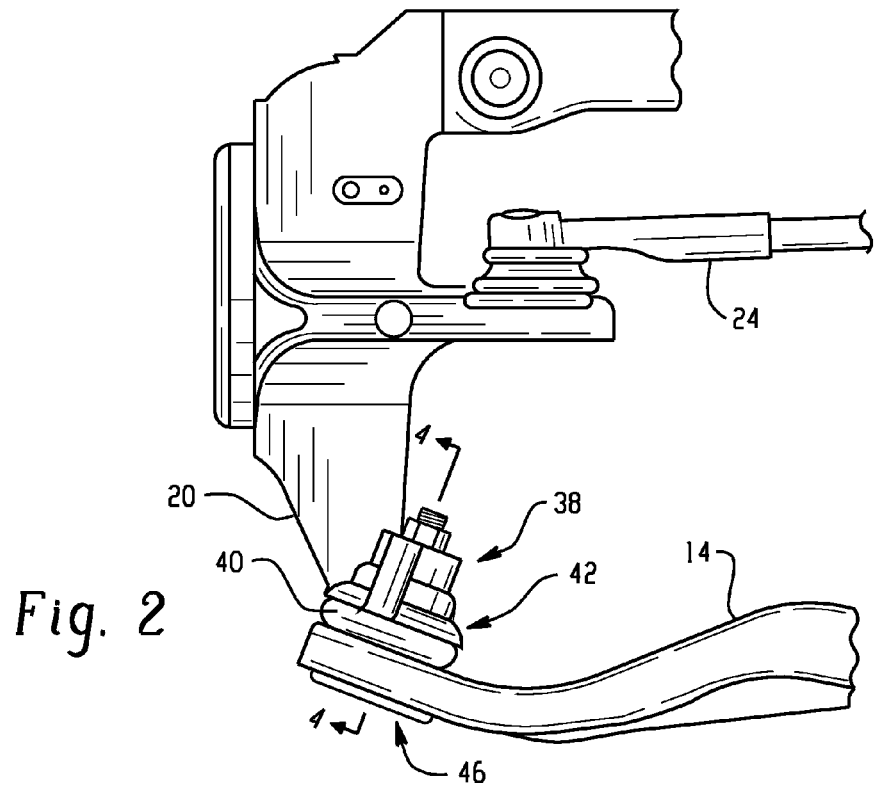
FIG. 2 is an expanded view of a knuckle of the suspension of FIG. 1.
Figure 3:
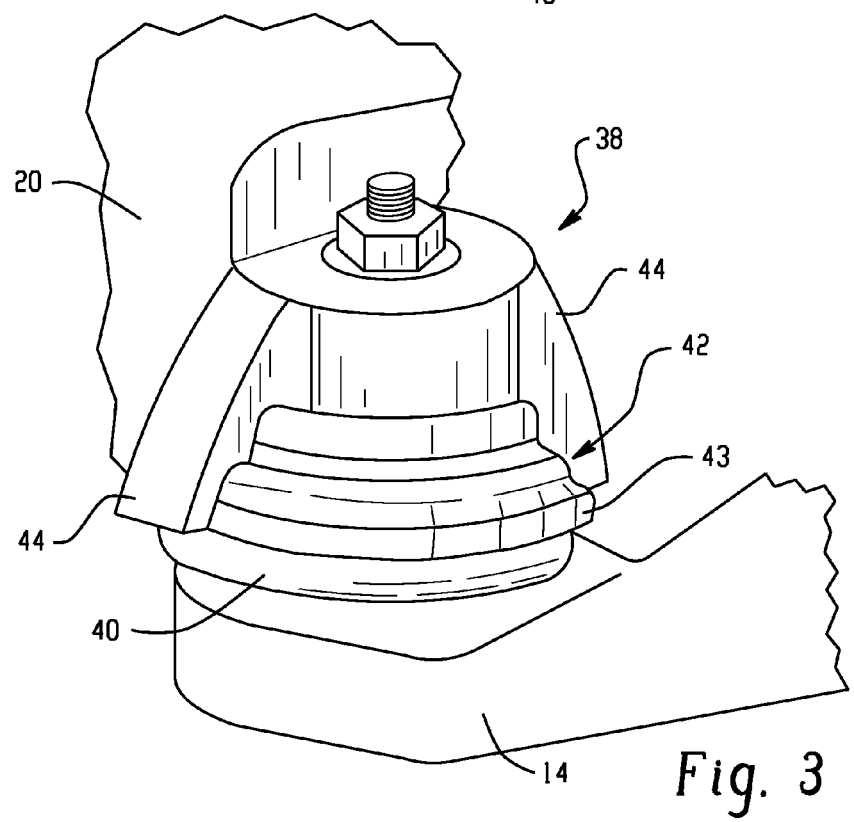
FIG. 3 is a view of a receptacle and shield portion of the knuckle of FIG. 2.
Figure 4:
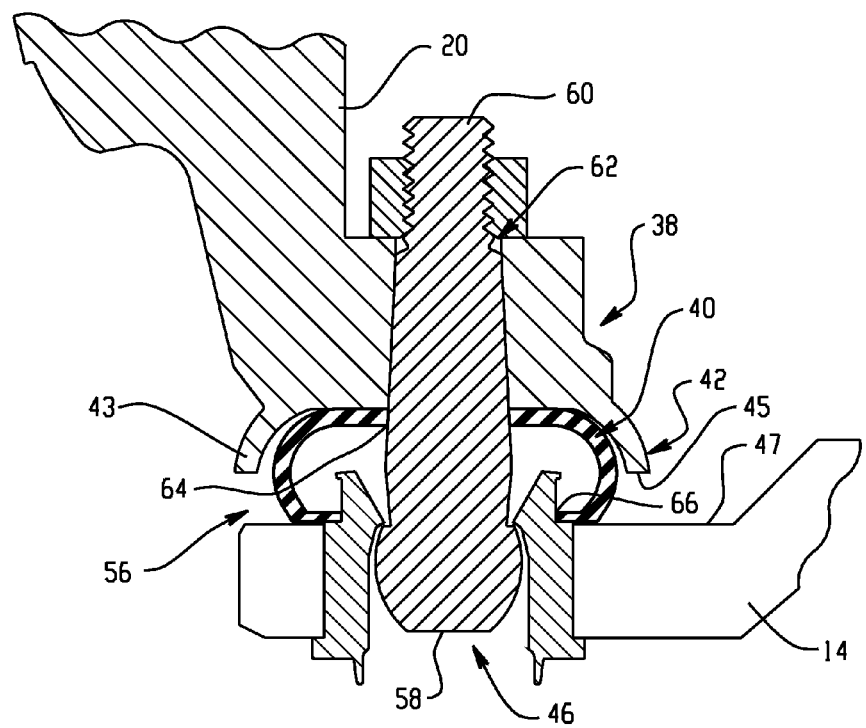
FIG. 4 is a view in section of the receptacle and shield of FIG. 3.

Referring now to FIGS. 2, 3 and 4, expanded views of knuckle 20 are shown. Knuckle 20 includes, in pertinent part, a receptacle portion 38 for receiving a flexible dust cover 40, the dust cover being located intermediate the receptacle and lower control arm 14 and generally enclosing a gap 56 therebetween to prevent ingress of contaminants into, and migration of lubricants from, a ball joint 46 that is generally enclosed by the dust cover. Ball pivot comprises a ball portion 58 and a shank portion 60. As can be seen from FIG. 4, shank portion 60 of the ball pivot extends through an aperture 62 that extends through receptacle portion 38. Shank portion 60 also extends through a pair of generally aligned openings 64, 66 of dust cover 40.

With reference to FIGS. 2-6, receptacle 38 includes a generally parabolic or cup-shaped shield 42 having a shroud portion 43 adapted to receive dust cover 40 according to an embodiment of the present invention. Shroud 43 generally surrounds dust cover 40 to protect the dust cover from the build-up of road-borne materials such as ice, snow, mud, sludge, debris and fluids (collectively termed "materials" herein) proximate the dust cover. The shape and position of shield 42 relative to dust cover 40 prevents direct exposure of the dust cover to road-borne materials, thereby resisting accumulation of the materials proximate the dust cover. Shield 42 also prevents dust cover 40 from being deformed or repositioned by the materials. Such deformation and repositioning of dust cover 40 could place it proximate other suspension components, making it susceptible to damage due to pinching as the suspension moves during normal operation of the vehicle.

Figure 5:
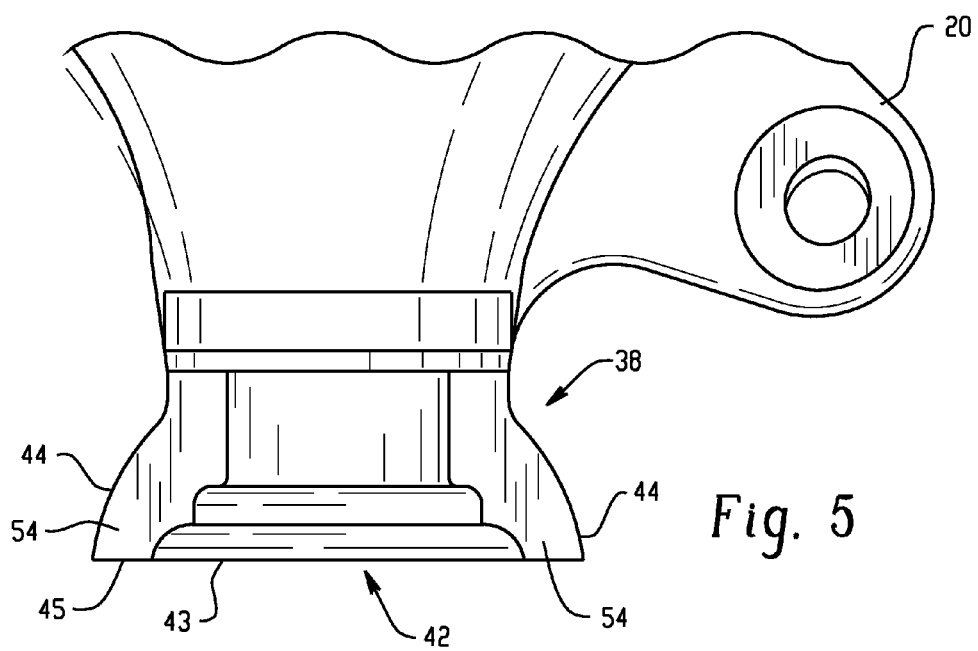
FIG. 5 is a side elevational view of the receptacle and shield of FIG. 3.
Figure 6:
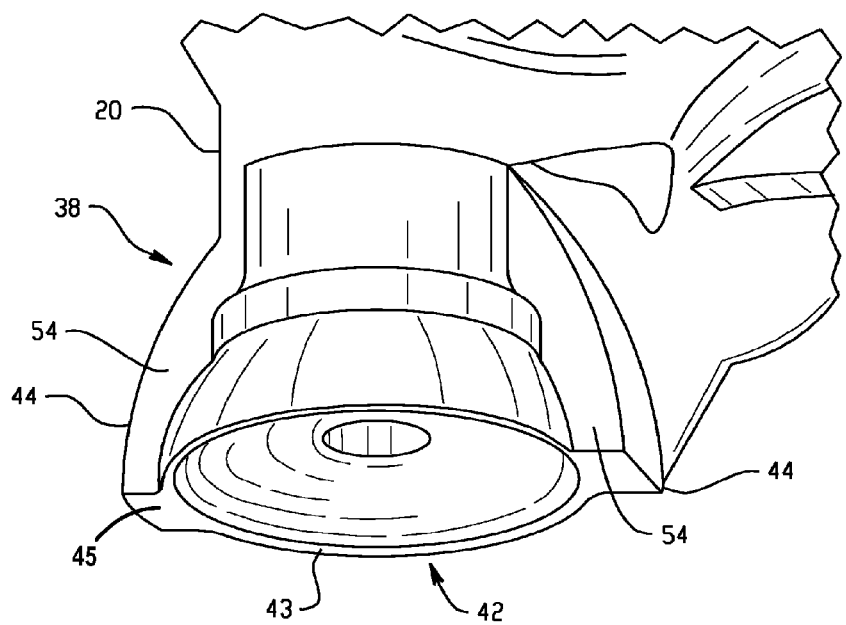
FIG. 6 is a perspective end view of the receptacle and shield of FIG. 3.

Shield 42 is both preferably rigid and is rigidly connected to knuckle 20, as shown in FIGS. 5 and 6. Shield 42 may be made of any rigid substance suitable for the environment of suspension 10 including, without limitation, metal, plastics and composites. In addition, shield 42 may be either a separate component connected or coupled to receptacle 38, or fabricated as an integral part of the receptacle. In certain embodiments shield 42 and receptacle 38 are fabricated as a single piece as portions of knuckle 20, the knuckle being constructed using any combination of conventional casting and/or machining processes.

Shield 42 may additionally act to break up rigid materials, such as ice, that accumulates proximate dust seal 40. With reference to FIGS. 1-4, shield 42 moves relative to lower control arm 14 as the vehicle moves over uneven surfaces and/or knuckle 20 is pivoted to steer the vehicle. For example, with reference to FIG. 2, it can be seen that pivotable movement of knuckle 20 causes shield 42 to rotate about a ball joint 46, causing the shield to move rotatably relative to arm 14. Material accumulated between lower control arm 14 and dust cover 40 is broken up by pressure exerted between a lower shield surface 45 of shroud 43 and an opposing, generally flat upper surface 47 of lower control arm 14 due to this movement. The broken-up material is subsequently shed due to the vibration, shock and centrifugal forces imposed upon the material by the normal movement of the vehicle.

Figure 7:
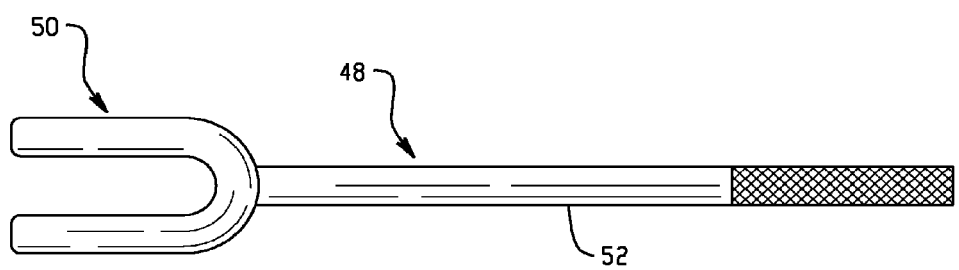
FIG. 7 is a view of a separating tool used in conjunction with an embodiment of the present invention.
Figure 8:
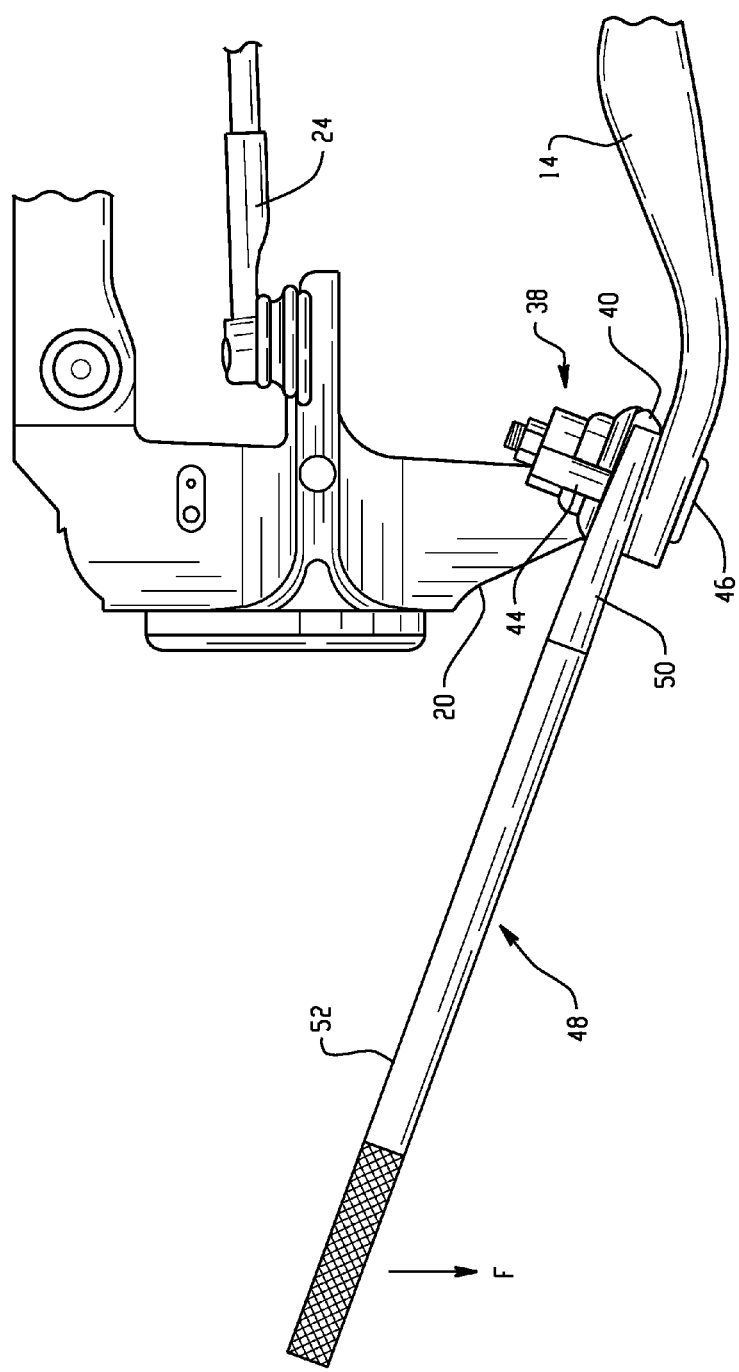
FIG. 8 depicts the tool of FIG. 7 in use.

In another embodiment of the present invention shield 42 may include at least one tang 44, as best shown in FIGS. 3, 5 and 6. Tangs 44 extend from at least one of receptacle 38 and shroud 43. In some embodiments tangs 44 may be integral to at least one of the receptacle and shroud. Tangs 44 are shaped to facilitate engagement of an installation and/or removal tool such as a conventional forked ball joint separator tool 48 (see FIG. 7) or a conventional threaded-clamp ball joint installation tool (not shown). Tangs 44 make assembly and disassembly of ball joint 46 less cumbersome when suspension system 10 is installed within the confines of the vehicle by providing a large engagement area for tool 48. For example, with reference to FIGS. 7 and 8, receptacle 38 may be separated from lower control arm 14 by inserted a forked portion 50 of tool 48 between the lower control arm and tangs 44. A downward force "F" (see FIG. 8) is applied to a handle portion 52 of tool 48, causing the forked portion 50 to exert a separating pressure against lower control arm 14 and tangs 44 effective to disengage ball joint 46 from receptacle 38.

Tangs 44 are both preferably rigid and rigidly connected to at least one of receptacle 38 and shield 42. Tangs 44 may be made of any rigid substance suitable for the environment of suspension 10 including, without limitation, metal, plastics and composites. In addition, tangs 44 may be either separate components connected or coupled to receptacle 38 and/or shield 42, or fabricated as an integral part of the receptacle and/or shield. In certain embodiments tangs 44 are fabricated as portions of receptacle 38 and/or shield 42, being constructed using any combination of conventional casting and/or machining processes.

Although tangs 44 are shown as generally arcuate in the figures, they may be any shape suitable for coupling to an installation/removal tool of a particular design. For example, the shape of tangs 44 may be configured to provide confronting edges or "sidewalls" 54 (see FIGS. 5 and 6) in any convenient geometric shape that push against accumulated road-borne material proximate gap 56 and in contact with the sidewalls, and deflect or wipe the material away from dust shield 40 as the tangs rotate relative to lower control arm 14 when the vehicle is steered.

While this invention has been shown and described with respect to a detailed embodiment thereof, it will be understood by those skilled in the art that changes in form and detail thereof may be made without departing from the scope of the claims of the invention.

What is claimed is:

1. A protected ball joint system in a vehicle suspension, comprising:
    a ball pivot having a shank portion and a ball portion;
    a receptacle extending from a pivotable knuckle, the receptacle having an aperture therethrough receiving the shank portion of the ball pivot;
    an arm receiving the ball portion of the ball pivot, the arm having an upper, generally flat arm surface;
    a flexible dust cover intermediate the receptacle and the arm, the dust cover enclosing a gap between the receptacle and the arm and including a pair of aligned openings through which the shank portion of the ball pivot extends;
    a shield comprising a generally parabolic, rigid shroud integral to and extending from the receptacle, the shroud generally surrounding the dust cover and terminating in a lower shield surface, the lower shield surface being facially opposed to the upper surface of the arm; and
    a pair of integral, arcuate-shaped tangs extending radially outwardly from at least one of the shield and the receptacle, the tangs having at least one sidewall and being configured to engage at least one of a ball joint installation tool and a ball joint removal tool, wherein movement of the lower surface of the shield relative to the upper surface of the arm exerts pressure upon road-borne materials accumulated proximate the dust cover to break up said materials, and wherein the sidewalls of the tangs are capable of rotating relative to the arm to urge accumulated road-borne material proximate the gap and in contact with the sidewalls away from the dust cover.

* * * * *